(12) United States Patent
Schwartz

(10) Patent No.: US 10,297,177 B1
(45) Date of Patent: May 21, 2019

(54) WIND LOAD LIMITED BANNER SUPPORT

(71) Applicant: Chad Schwartz, Annandale, NJ (US)

(72) Inventor: Chad Schwartz, Annandale, NJ (US)

(73) Assignee: CCS Technologies LLC, Annandale, NJ (US)

( * ) Notice: Subject to any disclaimer, the term of this patent is extended or adjusted under 35 U.S.C. 154(b) by 0 days.

(21) Appl. No.: 16/032,700

(22) Filed: Jul. 11, 2018

(51) Int. Cl.
　　*G09F 17/00*　　(2006.01)
　　*F16M 13/02*　　(2006.01)
　　*F16M 11/08*　　(2006.01)

(52) U.S. Cl.
　　CPC .............. *G09F 17/00* (2013.01); *F16M 11/08* (2013.01); *F16M 13/022* (2013.01); *G09F 2017/005* (2013.01)

(58) Field of Classification Search
　　CPC ... G09F 17/00; G09F 2017/005; F16M 11/08; F16M 13/022; E04H 12/32
　　See application file for complete search history.

(56) References Cited

U.S. PATENT DOCUMENTS

| | | | | |
|---|---|---|---|---|
| 3,612,460 A | * | 10/1971 | Smith | G09F 7/18 248/230.9 |
| 3,850,401 A | * | 11/1974 | Snediker | A47B 97/02 211/101 |
| 3,958,351 A | * | 5/1976 | Summey | G09F 7/18 40/607.12 |
| 4,095,360 A | * | 6/1978 | Dinan | G09F 7/22 40/603 |
| 4,554,885 A | | 11/1985 | Burny, Jr. | |
| 4,730,803 A | * | 3/1988 | Hillstrom | G09F 17/00 248/219.4 |
| 4,789,232 A | | 12/1988 | Urbanek | |
| 5,335,889 A | * | 8/1994 | Hopkins | G09F 7/18 248/219.4 |
| 5,388,794 A | * | 2/1995 | Wolff | G09F 17/00 248/219.4 |
| 5,694,733 A | * | 12/1997 | Gallemore, II | G09F 17/00 116/173 |
| 6,192,611 B1 | * | 2/2001 | Molla | G09F 15/0025 160/378 |

(Continued)

FOREIGN PATENT DOCUMENTS

EP　　　　1712708 A1　　10/2006

*Primary Examiner* — Anita M King
(74) *Attorney, Agent, or Firm* — Thomas J. Germinario

(57) ABSTRACT

A banner support supports a banner or flag unfurled on the pole. When a preset trigger wind load is exceeded, the banner bracket rotates away from the direction of the wind so as to limit the stress on the pole. The mechanism which enables bracket rotation comprises a disk-shaped cam with a spring-loaded plunger extending from the support arm that biases a cam follower into a proximal cam detent. Subject to the restraint of the cam follower, the cam rotates around a transversely axial cam shaft connected to the support arm. The cam is rigidly attached to the banner bracket, which rotates along with the cam. When the preset wind load is exceeded, the cam follower is forced out of the cam detent, allowing the cam and the connected banner bracket to rotate away from the wind direction. As the banner turns away from the wind, the wind stress decreases, allowing the spring plunger to force the cam follower back into the cam detent, thereby restoring the banner to its rest position.

8 Claims, 6 Drawing Sheets

(56) References Cited

U.S. PATENT DOCUMENTS 6,565,052 B1 * 5/2003 Doublet ................ G09F 7/18
                                              248/218.4
6,698,122 B1 * 3/2004 Merenlender .......... G09F 13/04
                                              40/572
8,601,739 B2   12/2013 Deitchman

* cited by examiner

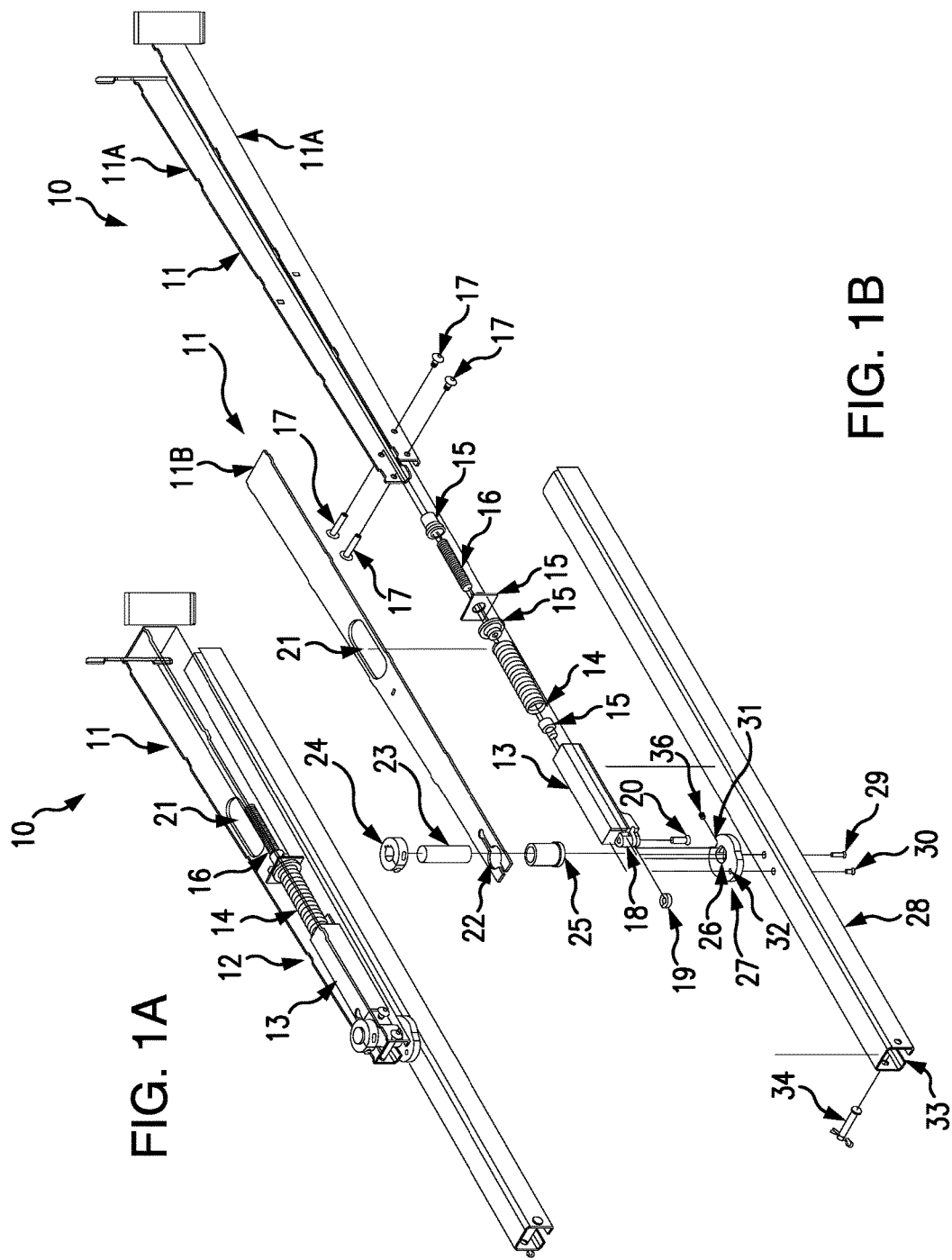

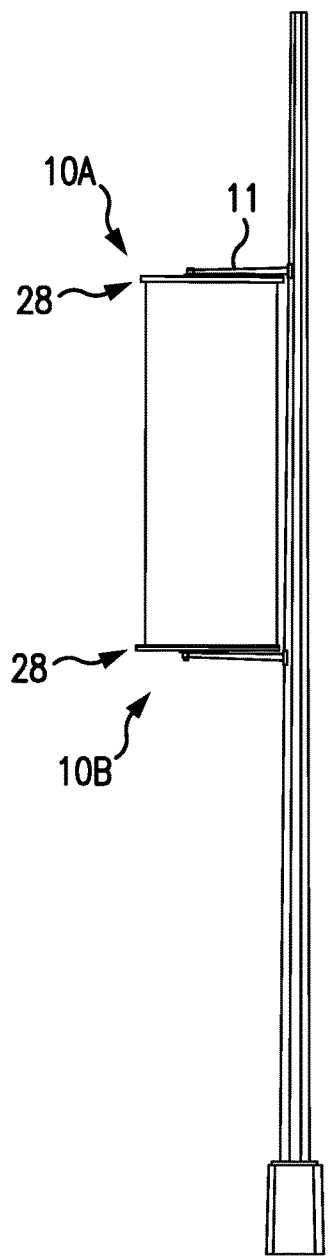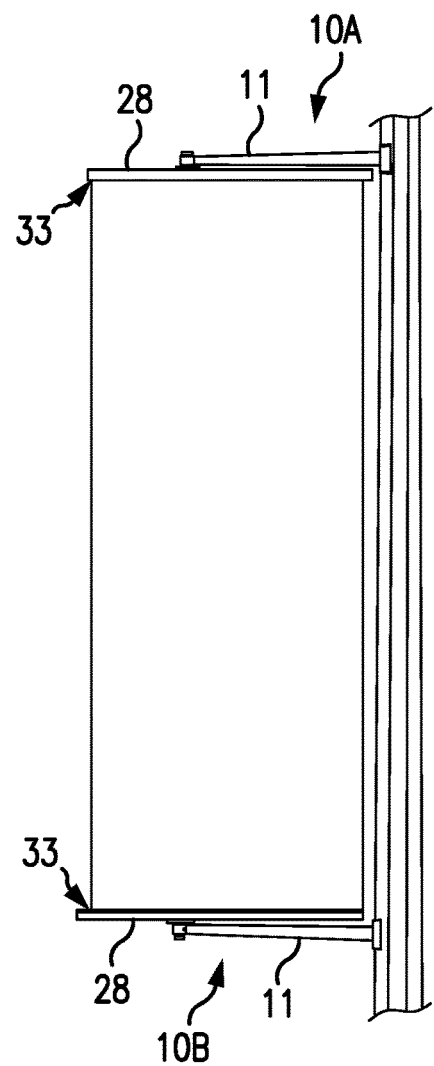
FIG. 3A
FIG. 3B

WIND LOAD LIMITED BANNER SUPPORT

FIELD OF INVENTION

The present invention relates generally to the field of devices for supporting banners and/or flags unfurled on a pole, and more particularly to banner supports having brackets that can rotate in response to wind stress.

BACKGROUND OF THE INVENTION

Many light and utility poles have attached banners and/or flags which are kept unfurled by one or more cantilevered horizontal support arms. Such poles can be damaged by wind loads against the unfurled banner or flag, particularly if the pole also supports other equipment and/or signs. Consequently, it is advantageous to provide a banner support having a bracket which will rotate away from the direction of the wind in response to a predetermined trigger load level of wind stress and which will rotate back to its initial rest position when the wind stress drops below the trigger load level.

SUMMARY OF THE INVENTION

The present invention is a device that supports a banner or flag unfurled on the pole. When a preset trigger wind load is exceeded, the banner bracket rotates away from the direction of the wind, so as to limit the stress on the pole. The mechanism which enables bracket rotation comprises a disk-shaped cam with a spring-loaded plunger extending from the support arm that biases a cam follower into a proximal cam detent. Subject to the restraint of the cam follower, the cam rotates around a transversely axial cam shaft connected to the support arm. The cam is rigidly attached to the banner bracket, which rotates along with the cam. When the preset wind load is exceeded, the cam follower is forced out of the cam detent, allowing the cam and the connected banner bracket to rotate away from the wind direction. As the banner turns away from the wind, the wind stress decreases, allowing the spring plunger to force the cam follower back into the cam detent, thereby restoring the banner to its rest position.

The banner support device can be deployed singly, wherein the banner is suspended from a single downward-facing device, or in pairs, wherein one downward-facing device supports the banner from above, while another upward-facing device supports the banner from below.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 1A is a perspective view of the preferred embodiment of the present invention in a repose position;

FIG. 1B is a perspective exploded view of the preferred embodiment of the present invention;

FIG. 3A is a perspective view of paired banner supports in the repose position according to the preferred embodiment of the present invention;

FIG. 3B is a detail view of FIG. 3A;

DETAILED DESCRIPTION OF THE PREFERRED EMBODIMENT

Figure 1C:
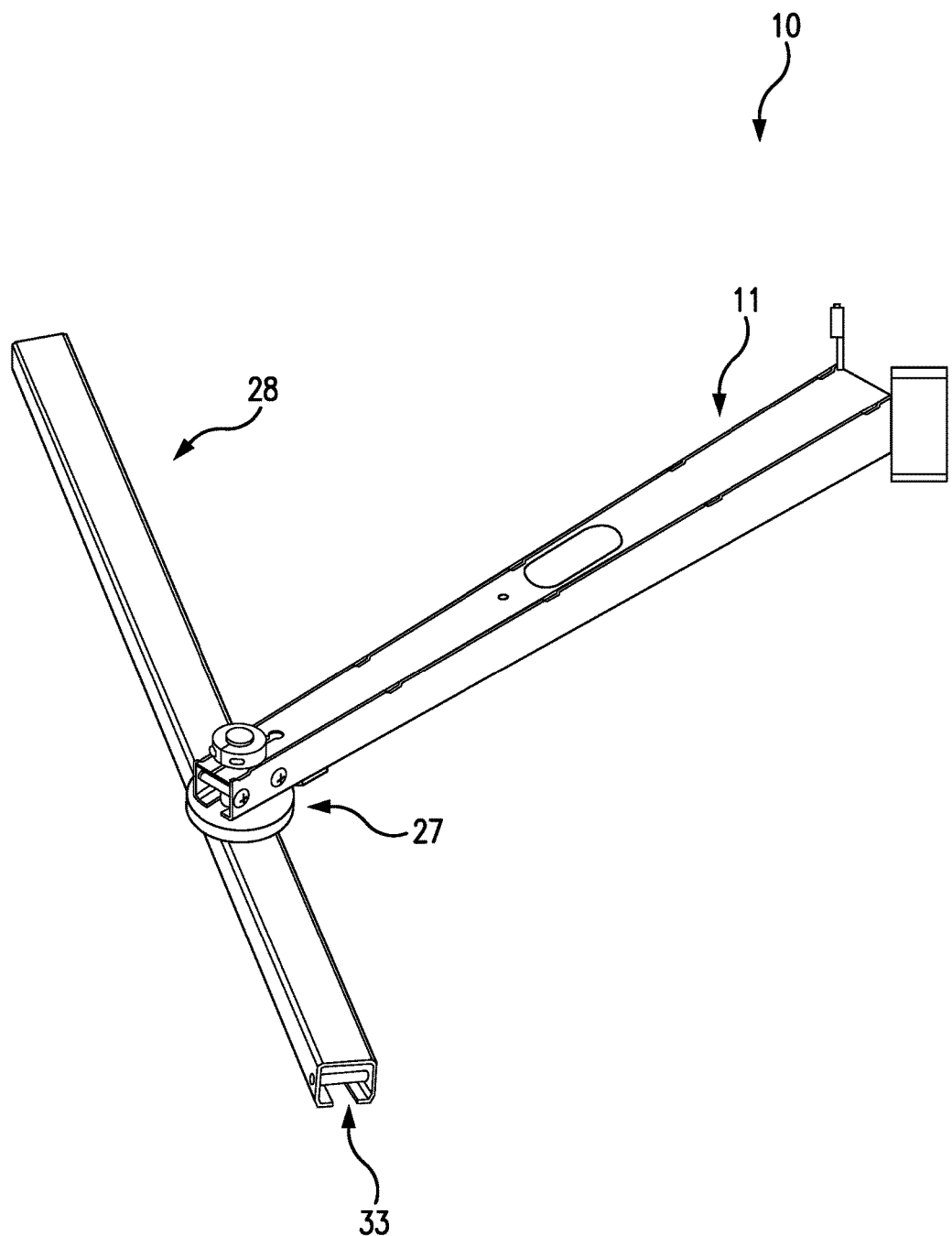
FIG. 1C is a perspective view of the preferred embodiment of the present invention in a rotated position.

Referring to FIGS. 1A through 1C, a banner support according to the preferred embodiment of the present invention 10 comprises a support arm 11, the proximal end of which is rigidly attachable to the pole on which the banner or flag is to be displayed. In this exemplary embodiment 10, the support arm 11 comprises two lateral arm members 11A and a top arm plate 11B. The support arm 10 extends generally orthogonally from the pole toward a distal end, which contains a spring-loaded plunger 12. The spring-loaded plunger 12 comprises a plunger module 13 connected to a stainless-steel compression spring 14, spring mounting hardware 15, and a spring preloaded adjustment screw 16, which is accessed through an adjustment aperture 21 in the top arm plate 11B and is operable to adjust the compression force of the spring 14. The spring-loaded plunger 12 is rigidly attached to the distal end of the support arm 11 by conventional fasteners, consisting in this exemplary embodiment of pin-in-star binding posts 17.

The distal end of the plunger module 13 contains a vertical cam follower sleeve 18, into which is inserted a cam follower screw 20 that retains a cam follower bearing 19. In the illustrated embodiment 10, the cam follower bearing 19 is an annular stainless-steel ball bearing, and the cam follower screw 20 is a socket-head cap screw.

The distal end of the top arm plate 11B contains a shaft aperture 22, through which a substantially cylindrical, vertical cam shaft 23 is secured by a clamp-on shaft collar 24. The cam shaft 23 passes through a flanged sleeve bearing 11 and through a congruous axial shaft aperture 26 in a compound-circular, disk-shaped cam 27. The bottom end of the cam shaft 23 contains a threaded bore through which the cam shaft 23 is rigidly attached to a slotted banner bracket 28 by a first countersunk machine screw 29.

The cam 27 is rigidly secured, through a threaded distal cam bore 32, to the banner bracket 28 by a second countersunk machine screw 30, so that the banner bracket 28 and the banner or flag attached to it are constrained to rotate along with the cam 27. The cam 27 has a generally arcuate cam detent 31 (best seen in FIGS. 2A and 2B), within which the cam follower bearing 19 is seated in the device's repose position, in which the banner bracket 28 is horizontally aligned with the support arm 11. The repose position corresponds to a wind stress on the banner bracket 28 which is less than a preset trigger wind load, to which the compression force of the spring 14 has been adjusted by the spring preload adjustment screw 16.

When the wind stress on the banner bracket 28, and the banner/flag attached to it, exceeds the trigger wind load, which would endanger the structural integrity of the pole, the torque on the cam 27 exceeds the compression force of the spring 14 exerted on the cam detent 31 through the cam follower bearing 19. The cam follower bearing 19 then disengages from the cam detent 31 and the cam 27 rotates transversely with respect to the support art 11 away from the direction of the wind, causing a synchronous rotation of the attached banner bracket 28 and the banner/flag attached thereto, as depicted in FIG. 1C. As the banner bracket 28 rotates away from the wind direction, the wind stress on the banner/flag drops, until the bracket 28 reaches an equilibrium position, at which the adjusted compression force of the spring 14 balances the wind stress.

When the wind subsides and the wind stress on the banner bracket falls below the trigger wind load, the compression force of the spring 14 exerted on the cam 27 through the cam follower bearing 19 causes the cam 27 to reverse its rotation and return to the repose position, with the cam follower bearing 19 again seated within the cam detent 31 and with the banner bracket 28 horizontally aligned with the support arm 11.

As shown in FIGS. 1A through 1C, the exemplary banner bracket 28 is an elongated cuboidal structure with a longitudinal banner channel 33 on its underside, into which a banner or flag can be inserted. The banner channel 33 can then be constricted by a clevis pin 34 so as to secure the banner/flag. As depicted in FIGS. 3A through 3D, a pair of banner supports 10 can be used to restrain both the top and bottom of the banner/flag, in which case the upper banner support 10A is oriented with its banner channel 33 facing downward, while the lower banner support 10B is oriented with its banner channel 33 facing up.

Figure 2B:
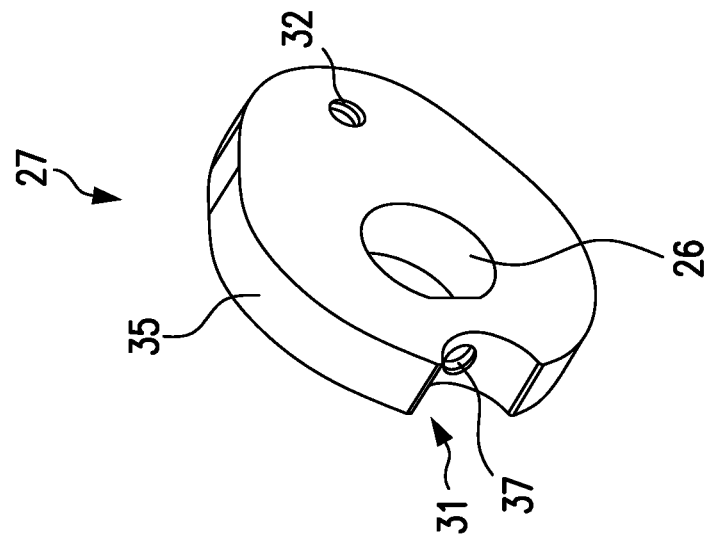
FIG. 2B is a detail perspective view of the cam depicted in FIG. 2A.
Figure 2A:
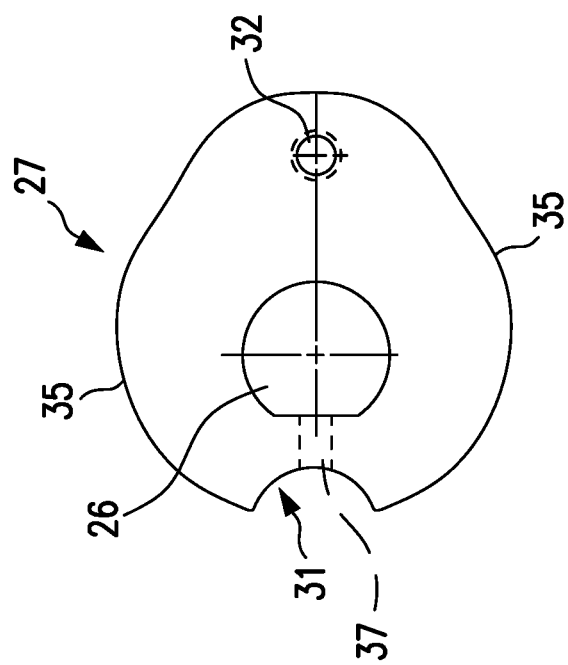
FIG. 2A is a detail plan view of a compound-circular disk-shaped cam according to the preferred embodiment of the present invention.

Referring to FIGS. 2A and 2B, detail views of the cam 27 illustrate the proximal cam detent 31 and the curved cam surfaces 35 on either side of the detent 31. In the preferred embodiment 10, the curved cam surfaces 35 are configured as compound circular curves, so that the cam's radius of curvature decreases from the proximal side (where the detent 31 is located) to the distal side of the cam 27. This shape has the effect of slowing the movement of cam follower 20 as it approaches an equilibrium position, in which the spring's compression force balances the wind stress on the banner bracket 28. This prevents the cam follower bearing 19 from "over-shooting" the equilibrium point causing the cam to execute a 180° rotation that reverses the orientation of the banner/flag suspended from the banner bracket 28.

The cam 20 is secured to the cam shaft 23 by a cam set screw 36 through a threaded proximal cam bore 37 through the detent 31. The threaded distal cam bore 32 receives the second countersunk machine screw 30 which rigidly attaches the cam 20 to the banner bracket 28.

Figure 2C:
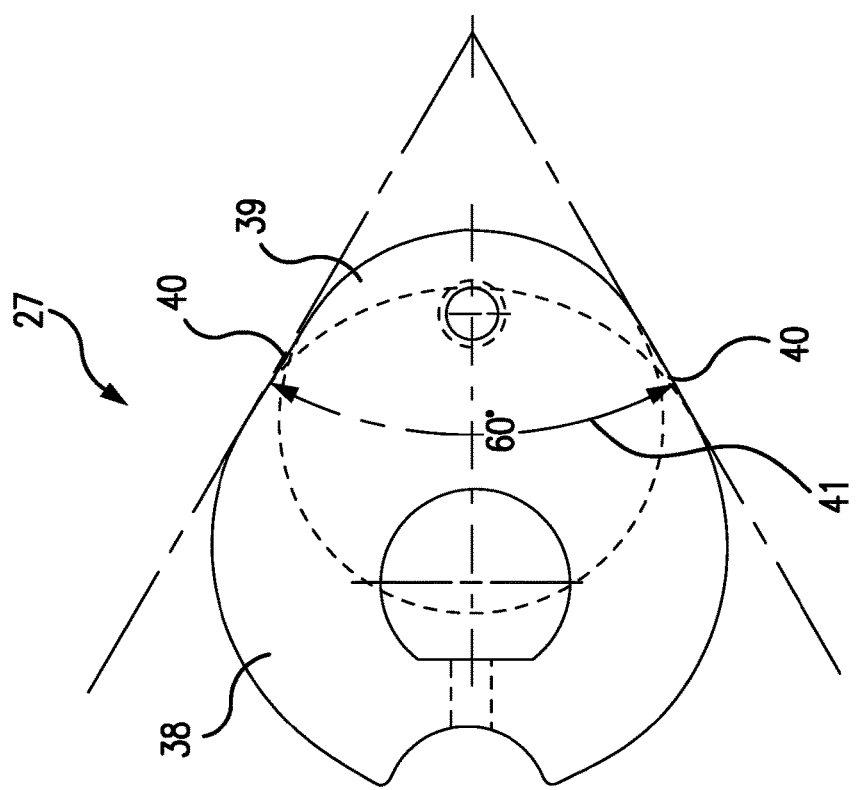
FIG. 2C is a depiction of the geometric structure of the cam depicted in FIGS. 2A and 2B.
Figure 3C:
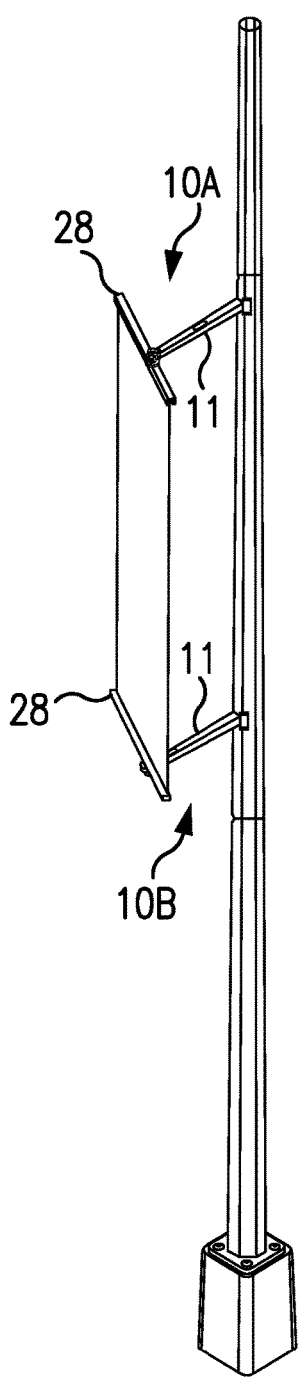
FIG. 3C is a perspective view of paired banner supports in the rotated position according to the preferred embodiment of the present invention.
Figure 3D:
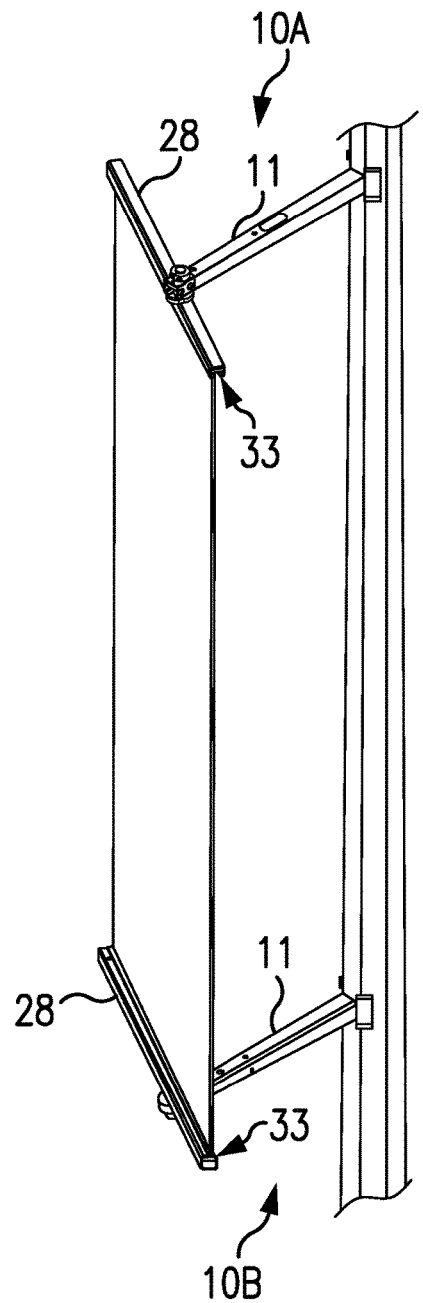
FIG. 3D is a detail view of FIG. 3C.

Referring to FIG. 2C, the preferred compound circular contours of the cam 20 and the curved cam surfaces 35 are illustrated. The curvature of the proximal side of the cam 20 is defined by a first circle 38, the radius of which exceeds that of a second circle 39, which defines the curvature of the distal side of the cam 20. In the illustrated example, the first circle has a radius of 1 inch and the second circle has a radius of 0.75 inches, so that the ratio of the radii is 1.33.

The transitions between the first circle 38 and the second circle 39 define two circle tangents 40, which are oriented at a tangent angle 41 with respect to each other. In this exemplary version, the tangent angle 41 is 60°. As the tangent angle 41 and the ratio of the circle radii increases, the decrease in the cam's radius of curvature toward the distal side also increases, thereby increasing the slowing effect on the motion of the cam follower 20 as it approaches the equilibrium position. Therefore, in locations where strung wind loads are expected, the cam can be configured with a greater tangent angle 41 and a higher ratio of the circle radii.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A device for supporting a banner or a flag on a pole exposed to a wind having a wind direction, the device comprising:
   at least one support arm, which is rigidly attachable to the pole at a proximal arm end and which extends transversely from the pole toward a distal arm end;
   at least one banner bracket to which the banner or the flag is attached;
   a cam which is rigidly attached to the banner bracket and which is rotatably attached to the support arm at the distal arm end by a transversely axial cam shaft, wherein the cam has a proximal cam side and a distal cam side, and wherein the cam has a cam detent on the proximal cam side and has curved cam surfaces on either side of the cam detent,
   a spring-loaded plunger, which has a proximal plunger end and a distal plunger end, and which is supported by the support arm, and which extends from the distal arm end, wherein the distal plunger end supports a cam follower and urges the cam follower into engagement with the cam;
   wherein the spring-loaded plunger exerts an adjustable compression force on the cam follower, and wherein the compression force is adjusted so that the cam follower engages the cam detent when a wind stress on the banner bracket is less than a trigger wind load, thereby preventing the cam and the banner bracket from rotating away from a repose position;
   wherein the compression force is adjusted so that the cam follower disengages from the cam detent and slidably engages one of the curved cam surfaces when the wind stress on the banner bracket is equal to or greater than the trigger wind load, thereby causing a transverse cam rotation and allowing the banner bracket to rotate away from the wind direction; and
   wherein, when the wind stress on the banner bracket falls below the trigger wind load, the adjusted compression force exerted by the spring-loaded plunger on the cam follower urges the cam follower to slide back along the curved cam surfaces to engage the cam detent, so as to reverse the transverse cam rotation, thereby causing the banner bracket to return to the repose position.

2. The device according to claim 1, wherein the curved cam surfaces are compound circular curves, and wherein the curved cam surfaces of the proximal cam side are defined by a first circle having a first radius, and wherein the curved cam surfaces of the distal cam side are defined by a second circle having a second radius.

3. The device according to claim 2, wherein the first radius is greater than the second radius.

4. The device according to claim 3, wherein a ratio of the first radius to the second radius is in the range of 1.2 to 1.8.

5. The device according to claim 3, wherein the first circle and the second circle are connected by two circle tangents, and wherein the circle tangents are oriented at a tangent angle with respect to one another.

6. The device according to claim 4, wherein the first circle and the second circle are connected by two circle tangents, and wherein the circle tangents are oriented at a tangent angle with respect to one another.

7. The device according to claim 5, wherein the tangent angle is in the range of 30° to 90°.

8. The device according to claim 6, wherein the tangent angle is in the range of 30° to 90°.

* * * * *